United States Patent
Wetherill et al.

(10) Patent No.: US 11,092,508 B2
(45) Date of Patent: *Aug. 17, 2021

(54) PUMP EFFICIENCY OF A FLUID PUMP

(71) Applicant: IOT Diagnostics LLC, Cincinnati, OH (US)

(72) Inventors: Rex A. Wetherill, Cincinnati, OH (US); John Rasmussen, Youngstown, OH (US); Jon Prescott, Lexington, KY (US)

(73) Assignee: IOT Diagnostics LLC, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/672,808

(22) Filed: Nov. 4, 2019

(65) Prior Publication Data

US 2020/0064221 A1    Feb. 27, 2020

Related U.S. Application Data

(63) Continuation of application No. 15/345,582, filed on Nov. 8, 2016, now Pat. No. 10,466,135.

(51) Int. Cl.
*G01M 3/26*     (2006.01)
*F04B 49/06*    (2006.01)
*F04B 49/10*    (2006.01)
*G08B 21/18*    (2006.01)
*F04B 19/22*    (2006.01)
*F04B 51/00*    (2006.01)

(52) U.S. Cl.
CPC .............. *G01M 3/26* (2013.01); *F04B 49/06* (2013.01); *F04B 49/065* (2013.01); *F04B 49/10* (2013.01); *G08B 21/182* (2013.01); *F04B 19/22* (2013.01); *F04B 51/00* (2013.01)

(58) Field of Classification Search
CPC ....................................................... G01M 3/26
USPC ........................................................ 702/51
See application file for complete search history.

(56) References Cited

U.S. PATENT DOCUMENTS

| | | |
|---|---|---|
| 4,173,144 A | 11/1979 | Pounder |
| 4,515,022 A | 5/1985 | Brand |
| 5,062,442 A | 11/1991 | Stenstrom et al. |

(Continued)

FOREIGN PATENT DOCUMENTS

| | | |
|---|---|---|
| EP | 1069312 A1 | 1/2001 |
| WO | 0227276 A2 | 4/2002 |

OTHER PUBLICATIONS

PCT Office, International Preliminary Report on Patentability issued in PCT/US2017/060149 dated May 14, 2019, 6 pages.

(Continued)

*Primary Examiner* — Ricky Go
(74) *Attorney, Agent, or Firm* — Wood Herron & Evans LLP

(57) ABSTRACT

Systems and methods of monitoring a condition of a pump. One or more characteristics of a fluid flow of a fluid is monitored in a flow path of the pump to determine a fluid leakage flow rate. The fluid leakage flow rate is compared to a nominal flow rate for the pump. The pump efficiency for the pump is determined based on the comparison of the fluid leakage flow rate to the nominal flow rate. The pump efficiency is compared to a pump efficiency threshold and the condition of the pump determined based on the comparison.

20 Claims, 5 Drawing Sheets

(56) References Cited

U.S. PATENT DOCUMENTS

| | | | |
|---|---|---|---|
| 5,157,935 A | 10/1992 | Gregory | |
| 5,563,351 A | 10/1996 | Miller | |
| 5,628,229 A | 5/1997 | Krone et al. | |
| 6,119,528 A | 9/2000 | Genack | |
| 6,260,004 B1 | 7/2001 | Hays et al. | |
| 6,297,626 B1 | 10/2001 | Boston et al. | |
| 6,330,525 B1 | 12/2001 | Hays et al. | |
| 6,829,542 B1 | 12/2004 | Reynolds et al. | |
| 7,097,351 B2 | 8/2006 | Lancon et al. | |
| 7,124,057 B2 | 10/2006 | Forster et al. | |
| 7,204,138 B2 | 4/2007 | Du | |
| 7,239,155 B2 | 7/2007 | Byington et al. | |
| 7,504,835 B2 | 3/2009 | Byington et al. | |
| 9,275,536 B2 | 3/2016 | Wetherill et al. | |
| 2001/0026225 A1 | 10/2001 | Young | |
| 2003/0184018 A1* | 10/2003 | Upton | F16J 15/004 |
| | | | 277/318 |
| 2006/0027267 A1 | 2/2006 | Fritze | |
| 2006/0162439 A1 | 7/2006 | Du | |
| 2006/0168611 A1 | 7/2006 | Fima | |
| 2007/0104986 A1* | 5/2007 | Tighe | H01M 8/04029 |
| | | | 429/434 |
| 2010/0162810 A1 | 7/2010 | Hasebe | |
| 2010/0223991 A1 | 9/2010 | Muraoka et al. | |
| 2010/0300683 A1* | 12/2010 | Looper | E21B 21/06 |
| | | | 166/250.01 |
| 2010/0301123 A1 | 12/2010 | Dorendorf | |
| 2011/0056192 A1 | 3/2011 | Weber et al. | |
| 2011/0056194 A1 | 3/2011 | Wojcicki et al. | |
| 2011/0162447 A1 | 7/2011 | Kirk et al. | |
| 2011/0215936 A1* | 9/2011 | Ansari | G01M 3/002 |
| | | | 340/584 |
| 2012/0167594 A1 | 7/2012 | Poisson et al. | |
| 2013/0099931 A1* | 4/2013 | Wetherill | F04B 49/06 |
| | | | 340/606 |
| 2014/0046605 A1 | 2/2014 | McHugh et al. | |
| 2014/0099212 A1 | 4/2014 | Dybing et al. | |
| 2016/0168976 A1* | 6/2016 | Zhang | E21B 47/0007 |
| | | | 73/40.5 R |
| 2017/0003200 A1* | 1/2017 | McDowell | F17D 5/06 |

OTHER PUBLICATIONS

European Patent Office, International Search Report and Written Opinion issued in PCT/US2017/060149 dated Feb. 13, 2018, 12 pages.

Impact Technologies, LLC, Product Brochure for Hydraulic Pump Life Monitor, 2010 (2 pages).

Webster Instruments, Product Brochure for FlowHUB Series Monitor, (Issue 2), Jan. 2011 (4 pages).

Impact Technologies, LLC, Short Company Overview and Pump/Actuator PHM Experience, 2008 (16 pages).

European Patent Office, International Search Report and Written Opinion of the International Searching Authority, International Application No. PCT/US2012/061921, dated Feb. 19, 2013 (18 pages).

\* cited by examiner

| Overall Fluid Temperature (T°F) | 3.0 | 3.10 | 3.20 | 3.30 | 3.40 | 3.50 | 3.60 | 3.70 | 3.80 | 3.90 |
|---|---|---|---|---|---|---|---|---|---|---|
| 109 | 1291.7762 | 1301.3835 | 1310.9909 | 1320.5982 | 1330.2056 | 1339.8129 | 1349.4203 | 1359.0276 | 1368.6349 | 1378.2423 |
| 108 | 1285.3136 | 1295.0077 | 1304.7018 | 1314.3959 | 1324.09, | 1333.7841 | 1343.4782 | 1353.1723 | 1362.8664 | 1372.5605 |
| 107 | 1279.4395 | 1289.1938 | 1298.9481 | 1308.7024 | 1318.4567 | 1328.211, | 1337.9653 | 1347.7196 | 1357.4739 | 1367.2282 |
| 106 | 1274.0128 | 1283.8096 | 1293.6064 | 1303.4032 | 1313.2, | 1322.9969 | 1332.7937 | 1342.5905 | 1352.3873 | 1362.1841 |
| 105 | 1268.9087 | 1278.7406 | 1288.5725 | 1298.4045 | 1308.2364 | 1318.0683 | 1327.9002 | 1337.7322 | 1347.5641 | 1357.396, |
| 104 | 1264.0208 | 1273.8914 | 1283.762, | 1293.6326 | 1303.5033 | 1313.3739 | 1323.2445 | 1333.1151 | 1342.9857 | 1352.8564 |
| 103 | 1259.2623 | 1269.1862 | 1279.1102 | 1289.0341 | 1298.958, | 1308.882, | 1318.8059 | 1328.7298 | 1338.6538 | 1348.5777 |
| 102 | 1254.5675 | 1264.5696 | 1274.5718 | 1284.5739 | 1294.576, | 1304.5782 | 1314.5803 | 1324.5824 | 1334.5846 | 1344.5867 |
| 101 | 1249.8928 | 1260.0066 | 1270.1204 | 1280.2343 | 1290.3481 | 1300.4619 | 1310.5757 | 1320.6895 | 1330.8033 | 1340.9171 |
| 100 | 1245.2179 | 1255.4828 | 1265.7476 | 1276.0125 | 1286.2774 | 1296.5423 | 1306.8072 | 1317.0721 | 1327.3369 | 1337.6018 |

Flow Rate (GPM)

FIG. 2

PUMP EFFICIENCY OF A FLUID PUMP

CROSS-REFERENCE TO RELATED APPLICATION

This application is a continuation of U.S. application Ser. No. 15/345,582, filed on Nov. 8, 2016, and entitled "Pump Efficiency of a Fluid Pump", the disclosure of which is incorporated by reference herein in its entirety.

FIELD OF THE INVENTION

The present invention relates generally to fluid circuits and, more particularly, to generating an operating condition of a pump in a fluid circuit.

BACKGROUND OF THE INVENTION

Industrial systems often times utilize fluid power systems to perform work, such as to run hydraulic motors or to extend and retract cylinders in various manufacturing or production environments, for example. These fluid power systems include fluid pumps that are used to pressurize fluid, such as hydraulic fluid, proportionate to a resistive load in the system. To pressurize the fluid, the pumps have rotating components that gradually wear over time and may eventually fail if the wear is left unchecked.

Failure of the pump can have catastrophic consequences. For example, if a pump abruptly fails, substantial debris can be introduced into the system causing damage to downstream components. In addition, catastrophic failures can result in substantial disruption of a manufacturing process. In view of the consequences of pump failure, it is desirable to perform periodic preventive maintenance on fluid power systems. During preventive maintenance, mechanics can replace worn pumps before they fail catastrophically, thus avoiding damage to other components or a major disruption in production.

One problem, however, is how to objectively schedule preventive maintenance. Generally, preventive maintenance schedules are developed from past experience and are subjective. Because pump wear cannot be easily monitored during operation, failures may not be easily predicted. In this regard, fluid pumps, and specifically piston pumps and piston motors, have an external case drain from which fluid leaks during operation based on designed leakage rates to provide hydrostatic balance of the pistons. This is accomplished by an orifice from the front of the piston (pressure side) to the balancing shoe, which has an area equal to the front or pressure side of the pistons. Fluid leakage from the case drain may be due to increased leakage within the pump around and between various components and seals in the pump. As any one or more of the components wears, the fluid exiting the case drain may increase. By sensing the flow of fluid through a case drain, an estimate of the remaining pump life may be made. In situations where the fluid exiting the case drain reaches a predetermined volume, preventive maintenance may be scheduled.

Prior art devices for measuring leakage from a case drain, however, are generally complicated in design and may be costly. One known device is disclosed in U.S. Pat. No. 5,563,351. However, the disclosed device is a complicated venturi design which requires sophisticated analysis techniques and may be difficult to calibrate. Furthermore, the disclosed design fails to provide any measurement of other parameters of the fluid power system at the case drain. Rather, other parameters, for example, temperature and pressure, are measured at the pump, which requires additional wiring and connectivity to the device. For this reason, such measurements are costly or may not be taken at all. In view of this deficiency, the information needed to predict an impending pump failure may be missing.

It would be desirable, accordingly, to provide devices that address these and other problems associated with conventional devices designed for such purposes.

SUMMARY OF THE INVENTION

The present invention overcomes the foregoing and other shortcomings and drawbacks of known pump monitoring devices for use in fluid circuits. While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, a computer implemented method determines a pump efficiency of a fluid pump. According to one aspect of the present invention, a characteristic of fluid flow is monitored at a first point and at a second point on a flow path of the fluid pump. A fluid leakage that is a difference in the characteristic of the fluid flow at the first point and the second point is determined. The fluid leakage is compared to a predetermined nominal fluid flow for the fluid pump. The predetermined nominal fluid flow is a predetermined optimal fluid flow for the fluid pump when operating with a predetermined minimal amount of fluid leakage. The pump efficiency is generated for the fluid pump based on the comparison of the fluid leakage to the predetermined nominal flow. The pump efficiency is an indicator as to an amount of fluid leakage that is leaked from the flow path as compared to the amount of fluid leakage when operating with the predetermined minimal amount of fluid leakage.

According to another aspect of the present invention, a system for determining a pump efficiency of a fluid pump includes a fluid monitoring device and a fluid computing device. The fluid monitoring device is configured to monitor a characteristic of fluid flow at a first point and at a second point on a flow path of the fluid pump. The flow path is a path that the fluid flows through the fluid pump. A fluid computing device is configured to determine a fluid leakage that is a difference in the characteristic of fluid flow at the first point and at the second point. The fluid computing device is also configured to compare the fluid leakage to a predetermined nominal flow of the fluid pump. The predetermined nominal fluid flow is a predetermined optimal fluid flow for the fluid pump when operating with a predetermined minimal amount of fluid leakage. The fluid computing device is also configured to generate the pump efficiency for the fluid pump based on the comparison of the fluid leakage to the predetermined nominal fluid flow. The pump efficiency is an indicator as to an amount of fluid leakage that is leaked from the flow path as compared to the amount of fluid leakage when operating with the predetermined minimal amount of fluid leakage.

The above and other objectives and advantages of the present invention shall be made apparent from the accompanying drawings and description thereof.

BRIEF DESCRIPTION OF THE DRAWINGS

The accompanying drawings, which are incorporated in and constitute a part of this specification, illustrate an embodiment of the invention and, together with a general description of the invention given above, and the detailed description of the embodiments given below, serve to explain the principles of the invention.

FIG. 2 is a schematic view of an exemplary A/D value table for the fluid pump according to one embodiment of the invention.

DETAILED DESCRIPTION OF THE INVENTION

Figure 1:
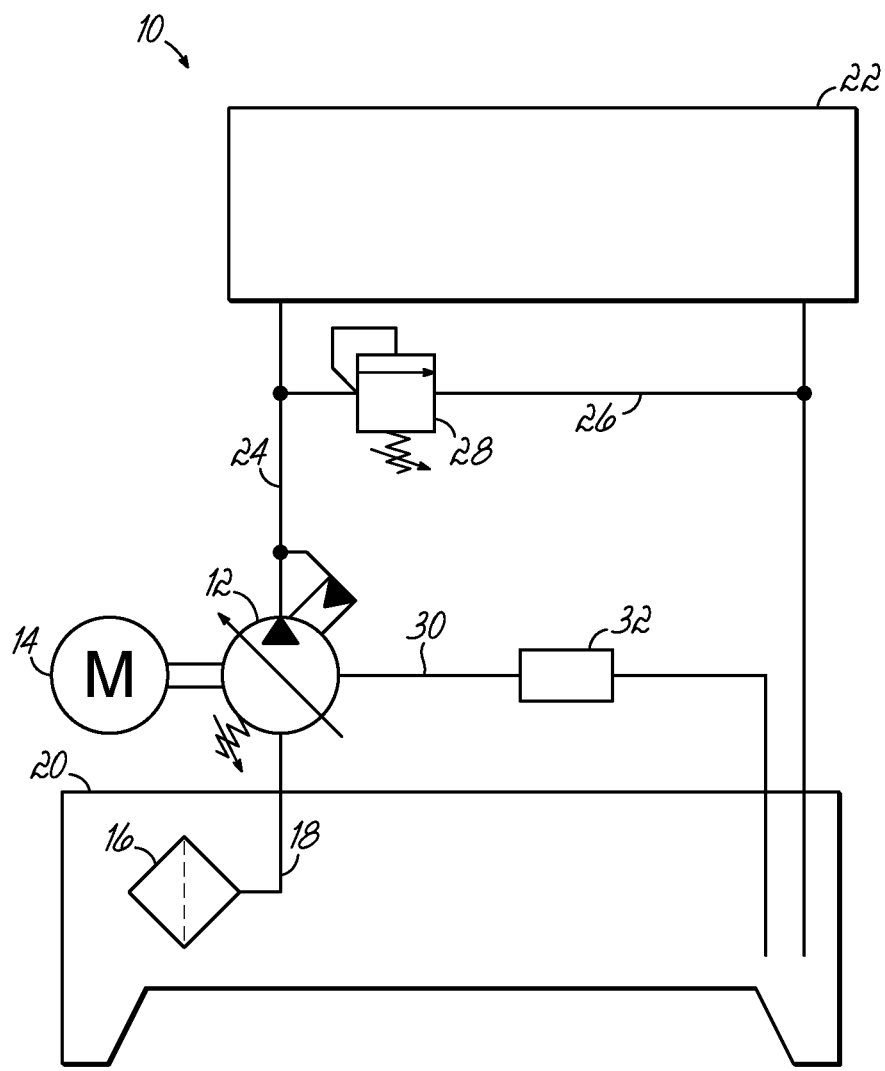
FIG. 1 is a schematic view of a fluid power system according to one embodiment of the invention.

In the Detailed Description herein, references to "one embodiment", "an embodiment", an "exemplary embodiment", etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment of the present invention, Applicant submits that it may be within the knowledge of one skilled in the art to affect such feature, structure, or characteristic in connection with other embodiments of the present invention whether or not explicitly described.

Embodiments of the present invention may be implemented in hardware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, each of the various components discussed can be considered a module, and the term "module" shall be understood to include at least one of software, firmware, and hardware (such as one or more circuit, microchip, or device, or any combination thereof), and/or any combination of software, firmware, and hardware. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further components within a module can be in a single device or distributed among multiple devices in a wired or wireless manner.

The following detailed description refers to the accompanying drawings that illustrate exemplary embodiments of the present invention. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the detailed description is not meant to limit the present invention to the embodiments described below.

With reference to FIG. 1, an exemplary fluid power system 10 may include a variable speed hydraulic pump 12 powered by a motor 14. During operation, the pump 12 may draw fluid through a filter 16 and suction line 18 from a tank 20. The pump 12 may pressurize the fluid for use by a machine 22 in fluid communication with the pump 12 via a main line 24. The system 10 may optionally include other circuits, such as a pressure relief circuit 26 including a relief valve 28 for relieving pressure in the system 10 in the event of a malfunction of the pump 12 or machine 22. The pump 12 may also include a case drain 30, which may drain any leakage of the fluid through the pump 12 back to the tank 20. While some fluid leakage through the case drain 30 may be normal, the flow through the case drain 30 may increase as the pump 12 wears during use.

In this regard and in one embodiment of the invention, a fluid monitoring device 32 is connected to the case drain 30 to measure a characteristic of the fluid flow. Fluid flow incorporates how a fluid flows throughout the fluid power system 10, and in particular, how the fluid flows through the case drain 30. For example, the flow rate of the fluid throughout the fluid power system 10 may vary as the pump 12 drives the machine 22. Although, the flow rate may vary as the machine 22 cycles through its functions, the flow rate may remain consistent for each cycle of the machine 22 as long as the pump 12 is operating correctly. However, degradation in performance of the pump 12 may cause the flow rate to differ from levels when the pump 12 is operating correctly when driving the machine 22.

The characteristic of the fluid flow may be an identifiable parameter of the fluid flow that may be measured by the fluid monitoring device 32 and/or derived from other characteristics and/or combination of characteristics measured by the fluid monitoring device 32. The fluid monitoring device 32 may monitor one or more characteristics of the fluid as the fluid passes from the pump 12 back to the tank 20 through the case drain 30. Characteristics of the fluid flow, whether measured by the fluid monitoring device 32 and/or derived from other characteristics measured by the fluid monitoring device, may be indicative of the performance of the pump 12. As the performance of the pump 12 degrades, the characteristics may provide an indication that the performance of the pump 12 is degrading and/or the rate at which the performance of the pump 12 is degrading.

For example, the temperature of the fluid as the fluid flows throughout the fluid power system 10 may be indicative of the performance of the pump 12. As the temperature of fluid increases over a period of time as compared to the temperature of the fluid when the pump 12 is operating properly, such an extended increase of temperature may indicate that the performance of the pump 12 is degrading. The characteristics of fluid flow that may be monitored by the fluid monitoring device 32 and/or derived from characteristics monitored by the fluid monitoring device 32 may include, but are not limited to, flow rate, volume, temperature, pressure, pump efficiency, viscosity, thermal properties, Reynolds number and/or any other type of characteristic that may be an identifiable parameter of the fluid.

The fluid monitoring device 32 may monitor the characteristic of the fluid flow at a first point and a second point on a flow path of the pump. The flow path is a path that the fluid flows through the fluid power system 10. For example, the flow path includes the case drain 30 where the fluid flows from the pump 12 and into the tank 20. As the fluid flows through the fluid power system 10, differences between the characteristic as monitored by the fluid monitoring device 32 at the first point and then the second point may be indicative of fluid leakage within the pump 12.

The pump 12 circulates the fluid throughout the fluid power system 10 when driving the machine 22. The pump 12 may leak fluid in that the fluid suctioned from the tank 20 may leak from the pump 12 such that the fluid provided to the machine 22 may be less than the fluid suctioned from the tank 20. As the performance of the pump 12 degrades, the amount of fluid leaked from the pump 12 may increase. Eventually, the performance of the pump 12 may degrade to the point where there is so much fluid leaking from the pump 12 that the amount of fluid circulating through the pump 12 and the machine 22 may be such a low amount that significant damage may occur to the pump 12 and/or the machine 22.

The fluid leaked from the pump 12 when driving the machine 22 may be drained from the pump 12 by the case drain 30 in which the case drain 30 transports the fluid leakage from the pump 12 to the tank 20 so that the fluid leakage may then be circulated back into the pump 12. Thus, monitoring the characteristic of the fluid flow at a first point and a second point positioned on the case drain 30 by the fluid monitoring device 32 may enable the fluid leakage of the pump 12 to be determined. The fluid monitoring device 32 may also monitor the characteristic of the fluid flow at a first point and a second point positioned anywhere on the flow path of the fluid power system 10 that may enable the fluid leakage of the pump 12 to be determined.

Differences of the characteristic at the first point and the second point that exceeds a threshold of correct operation of the pump 12 may indicate that the fluid leakage of the pump 12 is increasing which also indicates that the performance of the pump 12 is degrading. In an embodiment, the fluid monitoring device 32 may monitor the flow rate of the fluid at the first point and the second point on the case drain 30. The fluid leakage of the pump 12 may then be determined based on the difference of the flow rate of the fluid at the first point and the second point. An increase in the flow rate of the fluid in the case drain 30 may be indicative that the amount of fluid leaking from the pump 12 is also increasing.

As a result, the determination of fluid leakage of the pump 12 from the difference of the flow rate of the fluid at the first and second points may also indicate that the performance of the pump 12 is degrading. For example, the fluid monitoring device 32 may monitor the flow rate in gallons per minute of the fluid at the first point and then the flow rate in gallons per minute of the fluid at the second point on the case drain 30. The fluid leakage of the pump 12 may then be determined based on the difference in the flow rate in gallons per minute of the fluid at the first point and the flow rate in gallons per minute at the second point.

In an embodiment, the fluid monitoring device 32 may monitor the volume of the fluid at the first point and the second point on the case drain 30. The fluid leakage of the pump 12 may then be determined based on the difference in the volume of the fluid at the first point and the second point. An increase in the volume of the fluid in the case drain 30 may be indicative that the amount of fluid leaking from the pump 12 is also increasing. As a result, the determination of fluid leakage of the pump 12 from the difference of the volume of the fluid at the first and second points may also indicate that the performance of the pump 12 is degrading. For example, the fluid monitoring device 32 may monitor the volume in gallons of the fluid at the first point and then the volume in gallons of the fluid at the second point on the case drain 30. The fluid leakage of the pump 12 may then be determined based on the difference of the volume in gallons of the fluid at the first point and the volume in gallons of the fluid at the second point.

The fluid monitoring device 32 may include an analog to digital (A/D) converter (not shown). The fluid monitoring device 32 may also include a first temperature sensor (not shown) positioned at the first point on the case drain 30 and a second temperature sensor (not shown) positioned at the second point on the case drain 30. The first temperature sensor may generate a first signal that represents the temperature of the fluid at the first point and the second temperature sensor may generate a second signal that represents the temperature of the fluid at the second point. The A/D converter may then generate a value from the first signal generated by the first temperature sensor and the second signal generated by the second temperature sensor in which the generated value is representative of the temperature differential between the temperature of the fluid at the first point and the temperature of the fluid at the second point.

The value that represents the temperature differential of the fluid in the case drain 30 may be associated with an overall temperature of the fluid as well as flow rate. Each possible overall temperature of the fluid may also have a corresponding flow rate of the fluid. Each possible value for the temperature differential that may be generated by the A/D converter may also have a corresponding overall temperature and corresponding flow rate of the fluid.

For example, FIG. 2 depicts an exemplary A/D value table 200 for the pump 12. The A/D value table 200 includes several different overall temperatures of the fluid for the pump 12. The A/D value table 200 begins with 100° F. and then goes up to 109° F. In an embodiment, the fluid monitoring device 32 may begin to monitor the characteristics of the fluid when the overall temperature of the fluid reaches 100° F. and then continue to monitor the characteristics of the fluid for each one degree increment above 100° F. The characteristics of the fluid may become adequately identifiable for the fluid monitoring device 32 to monitor once the overall temperature of the fluid reaches 100° F. However, the fluid monitoring device 32 may begin to monitor the characteristics of the fluid when the overall temperature of the fluid reaches any minimum temperature in which the characteristics of the fluid become adequately identifiable to determine fluid leakage.

The A/D value table 200 also includes several different flow rates in gallons per minute (GPM) for the fluid in the pump 12 for each overall temperature. For example, for each overall temperature of 100° F., the flow rate of the fluid for the pump 12 may be determined to be 3.0 GPM, 3.1 GPM, 3.2 GPM, 3.3 GPM, 3.4 GPM, 3.5 GPM, 3.6 GPM, 3.7 GPM, 3.8 GPM, and 3.9 GPM. As noted above, the A/D converter of the fluid monitoring device 32 may generate a value that is representative of the temperature differential of the fluid at the first point and the second point. The overall temperature of the fluid is also known.

Based on the temperature differential value and the overall temperature of the fluid, the flow rate of the fluid may be determined from the ND value table 200. For example, the A/D converter generates a value of 1286.2774 and the overall temperature of the fluid is 100° F. The corresponding flow rate for the value of 1286.2774 at an overall temperature 100° F. as provided by the A/D value table 200 is 3.4 GPM. Thus, the flow rate of the fluid as monitored by the fluid monitoring device is 3.4 GPM.

Each pump may have different flow rates as well as different temperature differential values that correspond to each overall temperature. As a result, each pump may have a customized A/D value table that is based on the temperature differential values and flow rates that correspond to each overall temperature specific to each pump. Each pump may also have a customized fluid monitoring device 32 that is configured with the customized A/D value table for the pump that the fluid monitoring device 32 is to monitor.

In an embodiment, the first temperature sensor may be a heated sensor and the second temperature sensor may be a non-heated sensor. As noted above, both the first temperature sensor and the second temperature sensor may be immersed in the fluid as the fluid flows through the case drain 30. The first temperature sensor may be positioned at the first point on the case drain 30 and the second temperature sensor may be positioned at the second point on the case drain 30 such that the first point and the second point are positioned a sufficient distance from each other so that the heated temperature sensor does not affect the fluid temperature at the location of the non-heated temperature sensor.

The heated temperature sensor may include a resistance, such as a 1.0 Watt resistor, that produces a constant amount of energy. The constant amount of energy may be in the form of heat and may raise the temperature of the heated temperature sensor until an energy equilibrium is reached. The energy equilibrium may be the amount of energy added by the resistance is substantially equal to the energy lost to the fluid. As the fluid flow increases, the amount of heat that is carried away from the heated temperature sensor by the fluid increases thus lowering the temperature of the heated temperature sensor until a new energy equilibrium is reached.

The overall temperature of the fluid and the temperature differential between the heated temperature sensor and the non-heated temperature sensor may be stored by the fluid monitoring device 32 and associated with A/D values similar to the A/D value table in FIG. 2. The flow rate of the fluid may then be computed in real-time by the fluid monitoring device 32 by simultaneously measuring the overall temperature of the fluid and the temperature differential between the heated temperature sensor and the non-heated temperature sensor and comparing these measurements to the A/D values included in the A/D value table for the particular fluid that is flowing through the case drain 30.

The fluid monitoring device 32 may also include a first pressure sensor (not shown) positioned at the first point on the case drain 30 and a second pressure sensor (not shown) positioned at the second point on the case drain 30. The first pressure sensor may generate a first signal that represents the pressure of the fluid at the first point and the second pressure sensor may generate a second signal that represents the pressure of the fluid at the second point. The A/D converter may then generate a value from the first signal generated by the first pressure sensor and the second signal generated by the second pressure sensor in which the generated value is representative of the pressure differential between the pressure of the fluid at the first point and the pressure of the fluid at the second point.

The value that represents the pressure differential of the fluid in the case drain 30 may be associated with an overall temperature of the fluid as well as flow rate. Each possible overall temperature of the fluid may also have a corresponding flow rate of the fluid for each possible overall temperature. Each possible value for the pressure differential that may be generated by the A/D converter may also have a corresponding overall temperature and corresponding flow rate of the fluid for each possible value generated by the A/D converter.

The pump 12 may also have a customized A/D value table with regard to the pressure differential values generated by the A/D converter for each corresponding overall temperature of the fluid. The flow rate of the fluid may be determined based on the relationship of the pressure differential value generated by the A/D converter and the overall temperature of the fluid as provided in the customized A/D table for pressure differential in a similar manner as discussed above with regard to temperature differential.

The A/D converter may also generate a value that is based on pressure differential and temperature differential. As noted above, the first and second temperature sensors generate signals that are representative of the temperatures of the fluid measured at the first point and second point, respectively. The first and second pressure sensors also generate signals that are representative of the pressures of the fluid measured at the first and second points, respectively. The A/D converter may generate a value that is representative of both the pressure differential and the temperature differential of the fluid flowing through the case drain 30 at the first and second points.

The value that represents the pressure differential and temperature differential of the fluid in the case drain 30 may be associated with an overall temperature of the fluid as well as flow rate. Each possible overall temperature of the fluid may also have a corresponding flow rate of the fluid for each possible overall temperature. Each possible value for the pressure differential and temperature differential that may be generated by the A/D converter may also have a corresponding overall temperature and corresponding flow rate of the fluid for each possible value generated by the A/D converter.

The pump 12 may also have a customized A/D value table with regard to the pressure and temperature differential values generated by the A/D converter for each corresponding overall temperature of the fluid. The flow rate of the fluid may be determined based on the relationship of the pressure and temperature differential value generated by the A/D converter and the overall temperature of the fluid as provided in the customized A/D table for pressure and temperature differential in a similar manner as discussed above with regard to temperature differential.

Figure 3:
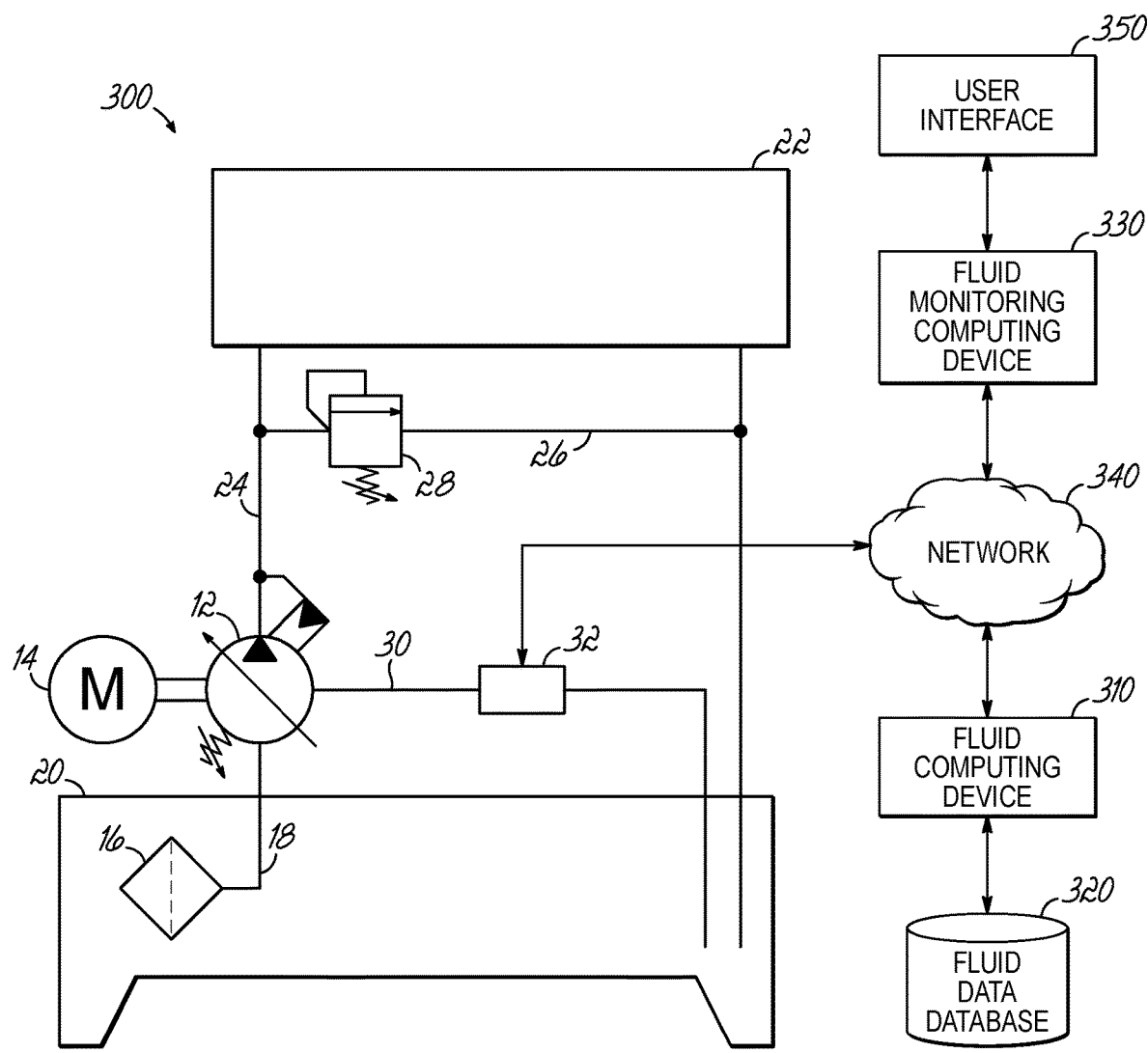
FIG. 3 is schematic view of the fluid computing configuration according to one embodiment of the invention.

FIG. 3 illustrates a fluid computing configuration 300 in which embodiments of the present invention, or portions thereof, may be implemented. The fluid computing configuration 300 includes the fluid power system 10 as discussed in detail in FIG. 1, a fluid computing device 310, a fluid data database 320, a fluid monitoring computing device 330, and a network 340. The fluid monitoring computing device 330 includes a user interface 350.

In one embodiment of the present invention, the fluid computing device 310 may communicate with the fluid monitoring device 32 to obtain fluid data generated from the monitoring of the characteristics of fluid flowing through the fluid power system 10 by the fluid monitoring device 32. The fluid computing device 310 may then analyze the fluid data to generate different types of analytics of the pump 12, such as whether a characteristic has exceeded a threshold, that provide insight which is easily understandable by a user as to the performance of the pump 12. The fluid computing device 310 may then communicate the analytics of the pump 12 to a fluid monitoring computing device 330 operated by the user so that the user may monitor the performance of the pump 12 via the analytics provided to the user via the fluid monitoring computing device 330.

The fluid monitoring device 32 includes a microprocessor, a memory and a network interface and may be referred to as a computing device or simply "computer". In one embodiment of the present invention, multiple modules may be implemented on the same computing device. Such a computing device may include software, firmware, hardware, or a combination thereof. Hardware can include, but is not limited to, a microprocessor and/or a memory.

As the fluid monitoring device 32 monitors the fluid data for each characteristic of the fluid flow of the fluid power system 10, the fluid monitoring device 32 may store the fluid data in the fluid data database 320 via the network 340. In an embodiment, each sensor that provides a signal to the fluid monitoring device 32 may have an Internet Protocol (IP) address associated with each particular sensor. The fluid monitoring device 32 may then stream the fluid data that is measured by each sensor for each characteristic that is monitored by the fluid monitoring device 32 via network 340 and then store the fluid data in the fluid data database 320 based on the IP address of the fluid data.

The fluid computing configuration 300 may include one or more fluid power systems 10 that include one or more pumps 12 in which each pump 12 is associated with a fluid monitoring device 32 that is monitoring the fluid flow of the pump 12. Thus, the fluid computing configuration 300 may also include one or more fluid monitoring devices 32 dependent on the quantity of pumps 12 included in the fluid computing configuration 300. Each fluid monitoring device 32 may then stream fluid data for each characteristic specific to the fluid flow of the pump 12 that each fluid monitoring device 32 is monitoring via network 340 to and store the fluid data in the fluid data database 320.

For example, the fluid computing configuration 300 may include a large factory that includes hundreds of pumps 12. Each of the pumps 12 that are active in the factory are associated with a fluid monitoring device 32 in which each individual fluid monitoring device 32 monitors the fluid data for each of the characteristics of the fluid flow for that specific pump 12. Each of the fluid monitoring devices 32 stream fluid data for the characteristics specific to each individual pump 12 and stores the fluid data specific to each pump 12 included in the factory in the fluid data database 320.

The fluid computing device 310 includes a processor, a memory, and a network interface, herein after referred to as a computing device or simply "computer". For example, the fluid computing device 310 may include a data information system, data management system, web server, and/or file transfer server. The fluid computing device 100 may also be a workstation, mobile device, computer, cluster of computers, set-top box or other computing device. In an embodiment, multiple modules may be implemented on the same computing device. Such a computing device may include software, firmware, hardware, or a combination thereof. Software may include one or more applications on an operating system. Hardware can include, but is not limited to, a processor, memory, and/or graphical user interface display. The fluid computing device 310 may be coupled to the fluid monitoring device 32 and/or coupled to the fluid power system 10. The fluid computing device 310 may also be positioned remote from the fluid monitoring device 32 and/or the fluid power system 10.

As the fluid computing device 310 generates the analytics of the fluid flow based on the fluid data, the fluid computing device 310 may query the fluid data database 320 for the fluid data associated with the characteristics that the fluid computing device 310 is to generate based on the IP address associated with the fluid data. For example, the fluid computing device 310 may retrieve the fluid data associated with the first temperature sensor and the second temperature sensor to generate the analytics of the temperature deviation between the first temperature sensor and the second temperature sensor based on the IP addresses associated with the fluid data measured by the first temperature sensor and the second temperature sensor. The fluid computing device 310 may generate the analytics of the fluid flow for each of the pumps 12 included in the fluid computing configuration 300.

The fluid monitoring computing device 330 includes a processor, a memory, and a network interface, herein after referred to as a computing device or simply "computer." For example, the fluid monitoring computing device 330 may be a workstation, mobile device, computer, cluster of computers, or other computing device. In an embodiment, multiple modules may be implemented on the same computing device. Such a computing device may include software, firmware, hardware, or a combination thereof. Software may include one or more applications on an operating system. Hardware can include, but is not limited to, a processor, memory, and/or graphical user interface display.

The user interface 350 may provide a user the ability to interact with the fluid monitoring computing device 330. The user interface 350 may be any type of display device including, but not limited to, a touch screen display, a liquid crystal display (LCD) screen, and/or any other type of display.

The fluid monitoring computing device 330 may be a computing device that is accessible to the user that is monitoring the performance of the pump 12. The fluid computing device 310 may stream the analytics to the fluid monitoring computing device 330 via network 340 and the fluid monitoring computing device 330 may display the analytics via the user interface 350. The fluid computing device 310 may be a stationary computing device and positioned in an office in which the user may monitor the analytics provided by the fluid computing device 310 for the pump 12. The fluid computing device 310 may also be a mobile device with which the user may be able to monitor the analytics for the pump 12 as the user changes locations.

The fluid monitoring computing device 330 may display the analytics via the user interface 350 streamed by the fluid computing device 310 for each of the pumps 12 in which the fluid computing device 310 has generated analytics. For example, the fluid computing configuration 300 may include a factory with hundreds of pumps 12. The fluid monitoring computing device 330 may display the analytics for each of the several pumps 12 included in the fluid computing configuration 300 such that the user may monitor the performance of each of the pumps 12 simultaneously. The fluid monitoring computing device 330 may also provide further analytics specific to a single pump 12 included in the fluid computing configuration 300 when the user requests to focus in on the analytics for a single pump 12 that is of interest to the user.

Wireless communication may occur via one or more networks 340 such as the Internet. In some embodiments of the present invention, the network 340 may include one or more wide area networks (WAN) or local area networks (LAN). The network may utilize one or more network technologies such as Ethernet, Fast Ethernet, Gigabit Ethernet, virtual private network (VPN), remote VPN access, a variant of IEEE 802.11 standard such as Wi-Fi, and the like. Communication over the network 340 takes place using one or more network communication protocols including reliable streaming protocols such as transmission control protocol (TCP). These examples are illustrative and not intended to limit the present invention. Wired connection communication may occur with, but is not limited to, a fiber optic connection, a coaxial cable connection, a copper cable connection, and/or any other direct wired connection.

As noted above, the fluid monitoring device 32 may monitor different characteristics of the fluid flow for the fluid power system 10, particularly characteristics of the fluid flow in the case drain 30 that may be related to fluid leakage of the pump 12. The fluid monitoring device 32 may then provide fluid data generated from the monitoring of the characteristics of the fluid flow by the fluid monitoring device 32 to the fluid computing device 310. The fluid data is a significant amount of data generated from the monitoring of the characteristics of the fluid flow over time that is incorporated by the fluid computing device 310 to determine different types of analytics for the pump 12. For example, the fluid data includes the flow rate of the fluid as monitored by the fluid monitoring device 32 for each cycle of the pump 12 from when the pump 12 was first commissioned to the current moment when the user is observing the performance of the pump 12 as provided by the fluid computing device 310.

Analytics of the pump 12 that may be generated by the fluid computing device 310 incorporate the fluid data for each characteristic as monitored by the fluid monitoring device 32 and from the fluid data to provide insight to the performance of the pump 12 that is easily understood by the user. The amount of fluid data monitored by the fluid monitoring device 32 and provided to the fluid computing device 310 may be immense. For example, the pump 12 may operate for significant portions of each day and may only be taken offline for short periods of time in a given year. Thus, the amount of fluid flowing through the case drain 30 may be significant as the pump 12 operates continuously for significant periods of time resulting in an immense amount of fluid data for each characteristic that is monitored by the fluid monitoring device 32.

Such an immense amount of fluid data monitored by the fluid monitoring device 32 and stored in the fluid data database 320 may be extremely difficult for the user to parse through to obtain an assessment of the performance of the pump 12. However, the fluid computing device 310 may analyze the immense amount of fluid data and provide meaningful analytics that provide insight as to the performance of the pump 12 that is easily understood by the user.

For example, the fluid computing device 310 may generate an analytic that presents the characteristic of pump efficiency to the user in an easily understandable manner. The pump efficiency of the pump may be an indicator as to an amount of fluid leakage that the pump 12 is experiencing. As the amount of fluid leakage increases, the likelihood that the performance of the pump 12 is decreasing also increases. Thus, the user may easily identify the performance status of the pump 12 based on the pump efficiency of the pump 12.

The fluid computing device 310 may incorporate the fluid data as monitored by the fluid monitoring device 32 for a particular characteristic of the fluid flow into an analytic such as a visual graph that depicts how the characteristic of the pump efficiency deviates over an extended period of time. Rather than the user having to parse through an immense amount of fluid data to assess the performance of the pump 12, the fluid computing device 310 incorporates the fluid data into an easily understood visual graph that provides insight to the user with regard to the performance of the pump 12.

Figure 4:
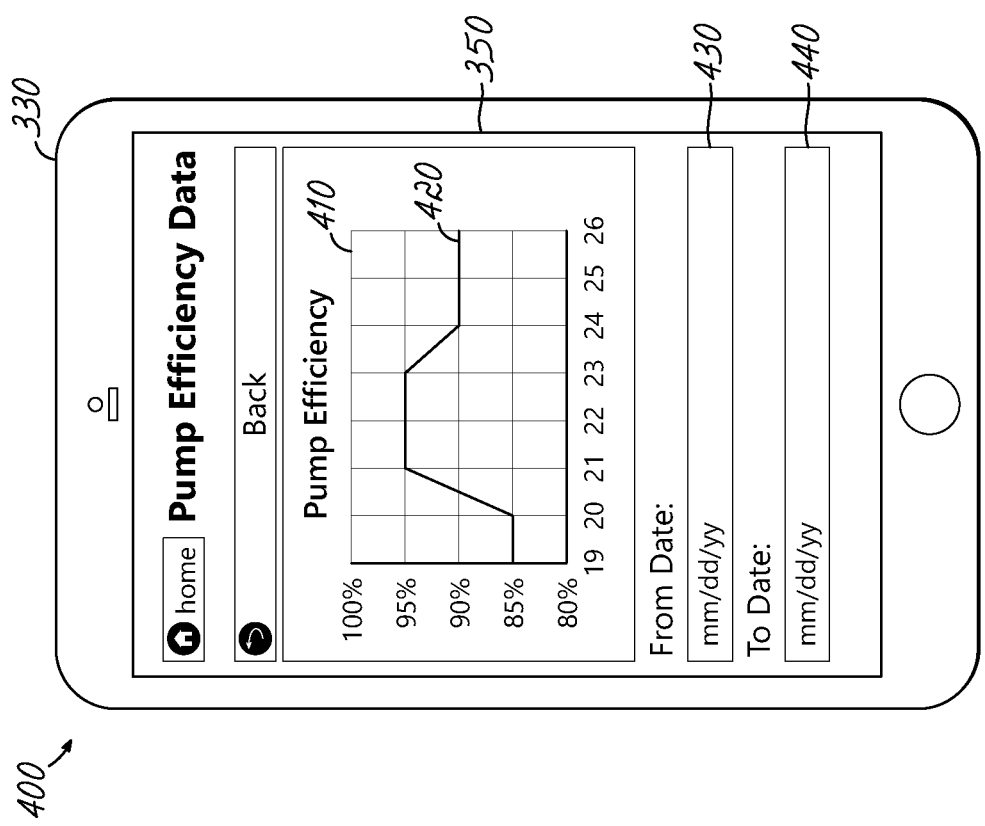
FIG. 4 is a schematic view of an exemplary visual graph configuration in which the fluid monitoring computing device displays a visual graph of pump efficiency via the user interface of the fluid monitoring computing device according to one embodiment of the invention.

For example, FIG. 4 depicts an exemplary visual graph configuration 400 in which the fluid monitoring computing device 330 displays a visual graph of pump efficiency via the user interface 350 of the fluid monitoring computing device. As noted above, the pump efficiency of the pump 12 may provide meaningful insight as to the performance of the pump 12. The pump efficiency may be the comparison of the fluid leakage of the pump 12 at a given moment and/or period of time as compared to the predetermined fluid leakage of the pump 12 during predetermined nominal fluid flow.

Typically, a pump experiences a minimal amount of fluid leakage. A brand new pump that has not experienced any degradation in performance due to use typically still has a minimal amount of fluid leakage. This minimal amount of fluid leakage may be predetermined in that the amount of fluid leakage for the pump may be measured by the manufacturer of the pump before shipping the pump to the customer. As the pump continues to operate at the customer's site, the amount of fluid leakage increases and deviates more and more from the predetermined minimal amount of fluid leakage. The predetermined nominal fluid flow is the fluid flow that the pump 12 experiences when operating with the predetermined minimal amount of fluid leakage which typically occurs early in the life of the pump 12.

The pump efficiency may then be the comparison of the fluid leakage of the pump 12 at any given moment and/or period of time as compared to the predetermined fluid leakage when the pump 12 is operating with the predetermined minimal amount of fluid leakage. As the fluid leakage of the pump 12 increases as compared to the predetermined fluid leakage when the pump 12 is operating with the predetermined minimal amount of fluid leakage, the pump efficiency decreases. Thus, as the pump efficiency decreases, the performance of the pump 12 may also be decreasing.

The exemplary visual graph configuration 400 depicted in FIG. 4 depicts how the pump efficiency for the pump 12 has deviated over a period of time. As can be seen in FIG. 4, user interface 350 of the fluid monitoring computing device 330 depicts a visual graph 410 of the pump efficiency during a single cycle of operation for the pump 12. The pump efficiency begins at a lower value on the plot 420 during the initial stages of the cycle and then increases and flat lines on the plot 420 during height of operation of the pump 12 during the cycle in which the amount of fluid leakage for the pump 12 increases. The pump efficiency then decreases and flat lines on the plot 420 as the pump 12 completes the cycle.

Although the visual graph configuration 400 depicts the pump efficiency for the pump 12 during a single cycle, the user may request that the pump efficiency generated by the fluid computing device 310 and depicted by the visual graph 410 displayed by the user interface 350 cover a significantly longer period of time than the single cycle. For example, the user may identify an initial time period 430 in which the user requests the fluid computing device 310 generate the pump efficiency for the pump 12 as well as the final time period 440. The fluid computing device 310 may then generate the pump efficiency based on the fluid data monitored by the fluid monitoring device 32 for that period of time and incorporated into the pump efficiency determination by the fluid computing device 310 for that period of time. Thus, the user may customize the period of time in which the visual graph 410 depicts the pump efficiency.

The visual graphs of characteristics and/or analytics of fluid flow that may be generated by the fluid computing device 310 may include, but are not limited to, pump efficiency, flow rate, volume, temperature, pressure, viscosity, thermal properties, Reynolds number and/or any other type of characteristic and/or analytic that may be an identifiable parameter of the fluid and/or indicator of the performance of the pump 12.

The fluid computing device 310 may simplify the analytics with regard to the fluid flow of the pump 12 even further from the visual graph while still providing the user with insight as to the performance of the pump 12 that is easily understood. As mentioned above, the user may be responsible for monitoring numerous pumps 12 included in the fluid computing configuration 300, such as a factory that includes numerous pumps 12. The user may also be responsible for many other facets of the factory in addition to the pump 12 and/or numerous other pumps 12, and may not be able to routinely analyze easily understood analytics such as the visual graph and/or other easily understood analytics generated by the fluid computing device 310.

Thus, the fluid computing device 310 may simply provide the status of the pump 12 with regard to different characteristics of the fluid flow based on a threshold for each of the different characteristics. The fluid computing device 310 may monitor each of the different characteristics to determine whether any of the different characteristics exceeds or deviates below a threshold for the pump 12. The threshold for each of the different characteristics may be customized for each specific characteristic. Each threshold may be based on a level in which the specific characteristic exceeds or deviates below and thus provides a significant indication that the performance of the pump 12 is degrading and requires the attention of the user.

The fluid computing device 310 may generate an alert and provide that alert to the user via the fluid monitoring computing device 330 when the specific characteristic exceeds or deviates below the designated threshold of the specific characteristic. Rather than requiring the user to monitor the visual graph for each characteristic and/or analyze other more complicated analytics generated by the fluid computing device 310, the fluid computing device 310 may generate an alert so the user is notified when any of the characteristics have exceeded and/or have deviated below the specified threshold for each characteristic. The user may then drill down further and request more detailed but yet still easily understandable analytics, such as the visual graph of the failing characteristic, to gain further analysis of what has occurred with regard to the failing characteristic.

For example, the predetermined nominal fluid flow of the pump 12 when initially being commissioned for the first time may have a predetermined minimal amount of fluid leakage in which on average 6% of the fluid flow is leaked from the pump 12 during operation of the machine 22. As the pump 12 continues to operate, the pump efficiency of the pump 12 based on the comparison of the fluid leakage of the fluid flow to the predetermined minimal amount of fluid leakage may start out at 94% but may then begin to decrease from 94% as the performance of the pump 12 degrades and the amount of fluid leakage increases. The threshold for the pump efficiency that, when deviated below, provides a significant indication that the performance of the pump 12 has degraded to a point where the pump 12 requires the attention of the user is 85%. The fluid computing device 310 then generates an alert to the user when the pump efficiency of the pump 12 deviates below the threshold of 85%.

As noted above, the pump 12 may have characteristics of the fluid flow that increase and/or decrease as the pump 12 cycles and may not remain constant. Further, the pump 12 may also have spikes and/or drops in characteristics as the pump 12 operates the machine 22 that may not necessarily occur in each cycle of the pump 12, but such a spike and/or drop may still not be a significant indication that the performance of the pump 12 is degrading. As noted above, the user may have significant responsibilities with regard to monitoring numerous pumps 12 and/or additional responsibilities and may not have the bandwidth to track down each and every alert generated for characteristics that exceed or deviate below the threshold during normal operation of the pump 12.

Thus, the fluid computing device 310 may monitor the pump efficiency of the pump 12 over a period of time that exceeds a single cycle of the pump 12. The fluid computing device 310 may then determine the average pump efficiency for the pump 12 that excludes any spikes and/or drops in characteristics that are generated during the normal operation of the pump 12 and are not cause of concern to the user with regard to any degradation in performance of the pump 12. The fluid computing device 310 may then determine the thresholds for each specific characteristic such that each threshold is customized to the specific characteristic and adequately accounts for any spikes and/or drops in the specific characteristic that are not a significant indication the performance of the pump 12 is degrading. The fluid computing device 310 may then limit the alerts that are generated for the user to when a threshold is legitimately exceeded or deviated below by the specific characteristic and legitimately requires the attention of the user.

Figure 5:
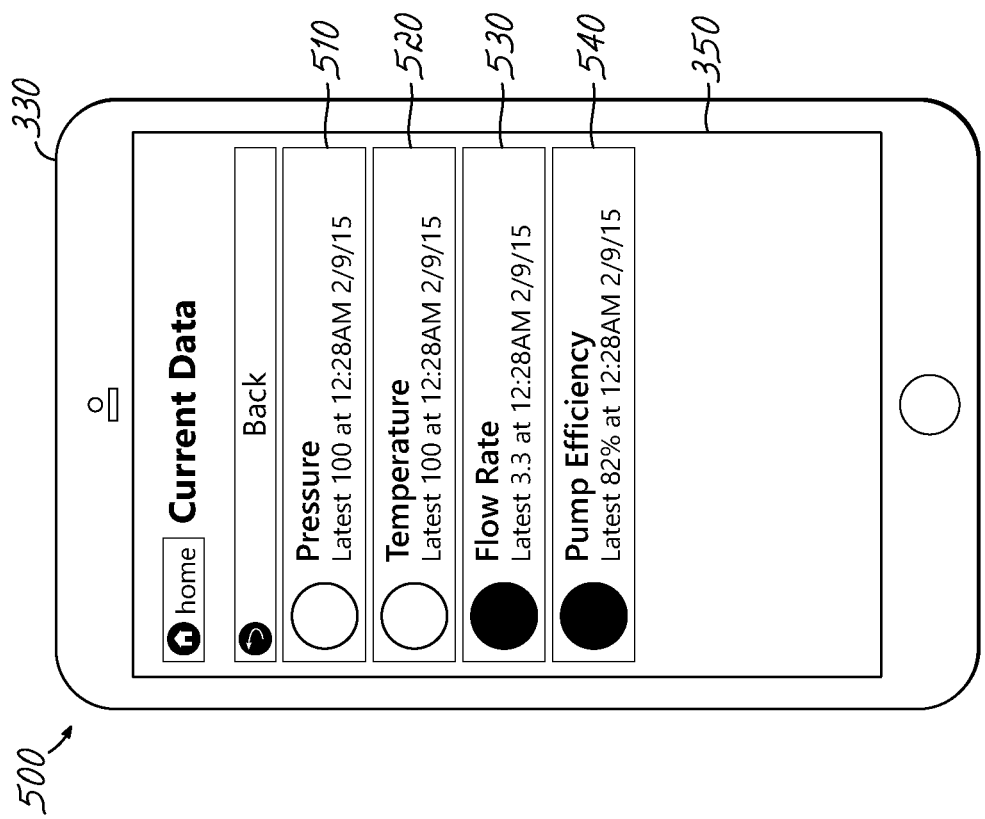
FIG. 5 is a schematic view of an exemplary threshold alert configuration in which the fluid monitoring computing device displays a status of several characteristics of the fluid flow with regard to whether the characteristics have exceeded or deviated below their respective thresholds via the user interface according to one embodiment of the invention.

For example, FIG. 5 depicts an exemplary threshold alert configuration 500 in which the fluid monitoring computing device 330 displays a status of several characteristics of the fluid flow with regard to whether the characteristics have exceeded or deviated below their respective thresholds via the user interface 350. The fluid computing device 310 may stream the status of each of the characteristics of the pump 12 via the network 340. The status of each of the characteristics may then be displayed by the fluid computing device 310 via the user interface 350.

The fluid monitoring computing device 330 may depict each of the statuses by an easily recognizable identifier. With regard to the exemplary threshold alert configuration 500 in FIG. 5, the fluid monitoring computing device 330 displays each of the statuses via the user interface 350 via two different colors. The fluid monitoring computing device 330 depicts the status of a characteristic that has not exceeded or deviated below its respective threshold with the status identifier of "green" in which the color "green" is a status that is universally recognized as there is no concern. The fluid monitoring computing device 330 depicts the status of the characteristic that has exceeded or deviated below its respective threshold and generates an alert with the status identifier of "red" in which the color "red" is a status that is universally recognized as there is cause for concern.

Specifically, the exemplary threshold alert configuration 500 in FIG. 5, provides the status of the characteristic of pressure of the fluid flow of the pump 12. The fluid computing device 310 may stream to the fluid monitoring computing device 330 the status of the pressure of the fluid flow with regard to whether the pressure of the fluid flow has exceeded the threshold, and the fluid monitoring computing device 330 may display that status via the pressure status indicator 510. As the pressure of the fluid flow increases and continues to be at an increased level over a period of time, such an increase may be indicative that the performance of the pump 12 is degrading and requires the attention of the user.

Thus, the fluid computing device 310 determines whether the pressure of the fluid flow has exceeded the threshold, and if so, streams to the fluid monitoring computing device 330 an alert that the pressure has exceeded the threshold. The fluid monitoring computing device 330 then displays the pressure status indicator 510 as "green" when the pressure remains below the threshold and then displays the pressure status indicator 510 as "red" as an alert when the pressure exceeds the threshold. The fluid computing device 310 may also stream fluid data associated with the pressure to the fluid monitoring computing device 330 that the fluid monitoring computing device 330 may display. For example, exemplary threshold alert configuration 500 in FIG. 5, displays that the latest pressure measurement is 100 PSI and was measured at 12:28 AM on Feb. 9, 2015.

The exemplary threshold alert configuration 500 in FIG. 5 also provides the status of the characteristic of temperature of the fluid flow of the pump 12. The fluid computing device 310 may stream to the fluid monitoring computing device 330 the status of temperature of the fluid flow with regard to whether the temperature of the fluid flow has exceeded the threshold and the fluid monitoring computing device 330 may display that status via the temperature status indicator 520. As the temperature of the fluid flow increases and continues to be at an increased level over a period of time, such an increase may be indicative that the performance of the pump 12 is degrading and requires the attention of the user.

Thus, the fluid computing device 310 determines whether the temperature of the fluid flow has exceeded the threshold, and if so, streams to the fluid monitoring computing device 330 an alert that the temperature has exceeded the threshold. The fluid monitoring computing device 330 then displays the temperature status indicator 520 as "green" when the temperature remains below the threshold and then displays the temperature status indicator 520 as "red" as an alert when the temperature exceeds the threshold. The fluid computing device 310 may also stream fluid data associated with the temperature to the fluid monitoring computing device 330 that the fluid monitoring computing device 330 may display. For example, exemplary threshold alert configuration 500 in FIG. 5 displays that the latest temperature measurement is 100° F. and was measured at 12:28 AM on Feb. 9, 2015.

The exemplary threshold alert configuration 500 in FIG. 5 also provides the status of the characteristic of the flow rate of the fluid flow of the pump 12. The fluid computing device 310 may stream to the fluid monitoring computing device 330 the status of the flow rate of the fluid flow with regard to whether the flow rate of the fluid flow has exceeded the threshold and the fluid monitoring computing device 330 may display that status via the flow rate status indicator 530. As the flow rate of the fluid flow increases and continues to be at an increased level over a period of time, such an increase may be indicative that the fluid leakage of the pump 12 is increasing and the performance of the pump 12 is degrading and requires the attention of the user.

Thus, the fluid computing device 310 determines whether the flow rate of the fluid flow has exceeded the threshold, and if so, streams to the fluid monitoring computing device 330 an alert that the flow rate has exceeded the threshold. The fluid monitoring computing device 330 then displays the flow rate status indicator 530 as "green" when the flow rate remains below the threshold and then displays the flow rate status indicator 530 as "red" as an alert when the flow rate exceeds the threshold. The fluid computing device 310 may also stream fluid data associated with the flow to the fluid monitoring computing device 330 that the fluid monitoring computing device 330 may display. For example, exemplary threshold alert configuration 500 in FIG. 5 displays that the latest flow rate measurement is 3.3 GPM and was measured at 12:28 AM on Feb. 9, 2015.

The exemplary threshold alert configuration 500 in FIG. 5 also provides the status of the characteristic of the pump efficiency of the fluid flow of the pump 12. The fluid computing device 310 may stream to the fluid monitoring computing device 330 the status of the pump efficiency of the fluid flow with regard to whether the pump efficiency of the fluid flow has deviated below the threshold and the fluid monitoring computing device 330 may display that status via the pump efficiency status indicator 540. As the pump efficiency of the fluid flow decreases and continues to be at a decreased level over a period of time, such a decrease may be indicative that the fluid leakage of the pump 12 is increasing and the performance of the pump 12 is degrading and requires the attention of the user.

Thus, the fluid computing device 310 determines whether the pump efficiency of the fluid flow has deviated below the threshold, and if so, streams to the fluid monitoring computing device 330 an alert that the pump efficiency has deviated below the threshold. The fluid monitoring computing device 330 then displays the pump efficiency status indicator 540 as "green" when the pump efficiency remains above the threshold and then displays the pump efficiency status indicator 540 as "red" as an alert when the pump efficiency deviates below the threshold. The fluid computing device 310 may also stream fluid data associated with the pump efficiency to the fluid monitoring computing device 330 that the fluid monitoring computing device 330 may display. For example, the exemplary threshold alert configuration 500 in FIG. 5 displays that the latest pump efficiency measurement is 82% and was measured at 12:28 AM on Feb. 9, 2015.

The threshold indicators of characteristics of fluid flow that may be generated by the fluid computing device 310 and displayed by the fluid monitoring computing device 330 may include, but are not limited to, pump efficiency, flow rate, volume, temperature, pressure, viscosity, thermal properties, Reynolds number and/or any other type of characteristic in which the threshold indicator of that characteristic may provide insight as to the performance of the pump 12. The alerts for when the characteristics of fluid flow have exceeded or deviated below the designated threshold as generated by the fluid computing device 310 and streamed to the fluid monitoring computing device 330 include a "red" status indicator, a text message, an email, and/or any other type of communication in which the user may be alerted that the threshold of a characteristic has been exceeded and/or deviated below.

As noted above, the fluid computing device 310 may determine the pump efficiency of the pump 12 and based on the pump efficiency, the user may easily assess the performance of the pump 12 and determine whether the pump 12 requires further attention before significant damage is done to the pump 12 and/or the machine 22. The fluid computing device 310 may determine the pump efficiency based on different characteristics of the fluid flow of the pump 12 as monitored and provided by the fluid monitoring device 32. The fluid computing device 310 may then incorporate the pump efficiency of the pump 12 based on the characteristics provided by the fluid monitoring device 32 into different types of analytics such as the visual graph 410 and/or the pump efficiency status indicator 540 so that the user may easily assess the performance of the pump 12.

In an embodiment, the fluid computing device 310 may determine the pump efficiency of the pump 12 based on the flow rate of the fluid monitored by the fluid monitoring device 32 at the first point and the second point on the case drain 30. The fluid computing device 310 may initially determine the flow rate of the pump 12 based on the difference of the flow rate of the fluid at the first point and the second point as monitored by the fluid monitoring device 32. As noted above, an increase in the flow rate of the fluid in the case drain 30 may be indicative that the amount of fluid leaking from the pump 12 is also increasing. As noted above, the nominal flow rate of the pump 12 is the flow rate of the pump 12 when the pump 12 experiences a minimum amount of fluid leakage.

As the flow rate of the pump 12 increases, the difference between the flow rate of the pump 12 as monitored and the nominal flow rate of the pump 12 also increases. The fluid computing device 310 may then determine the pump efficiency that represents the difference of the flow rate of the pump 12 as monitored and the nominal flow rate of the pump 12. As shown in Equation 1, the fluid computing device 310 may determine the pump efficiency of the pump 12 based on:

Pump Efficiency=(Nominal Flow Rate−Flow Rate as Monitored)/Nominal Flow Rate  (1).

Thus, as the difference between the flow rate of the pump 12 as monitored as compared to the nominal flow rate increases, the pump efficiency decreases, indicating that the fluid leakage of the pump 12 is increasing. The user may then easily assess the performance of the pump 12 based on the pump efficiency to determine whether the pump 12 requires further attention to prevent damage to the pump 12 and/or the machine 22.

In an embodiment, the fluid computing device 310 may determine the pump efficiency of the pump 12 based on the volume of the fluid monitored by the fluid monitoring device 32 at the first point and the second point on the case drain 30. As noted above, the fluid leakage of the pump 12 may be determined based on the difference in the volume of the fluid at the first point and the second point. An increase in the volume of the fluid in the case drain 30 may be indicative that the amount of fluid leakage from the pump 12 is also increasing.

As noted above, the pump efficiency of the pump 12 may also be determined from the fluid leakage of the pump 12. Thus, as the difference between the volume of the fluid in the case drain 30 as monitored at the first point and the second point of the pump 12 as compared to the nominal volume increases, the pump efficiency decreases indicating that the fluid leakage of the pump 12 is increasing. The user may then easily assess the performance of the pump 12 based on the pump efficiency determined from the volume of the fluid in the case drain 30.

As noted above, the fluid monitoring device 32 may include an A/D converter as well as a first temperature sensor positioned at the first point on the case drain 30 and a second temperature sensor positioned at the second point on the case drain 30. The A/D converter may generate a value based on the temperature differential between the temperature of the fluid measured by the first sensor at the first point and the temperature of the fluid measured by the second sensor at the second point. The value that represents the temperature differential of the fluid in the case drain may also be associated with an overall temperature of the fluid as well as flow rate. Each possible overall temperature of the fluid may also have a corresponding flow rate of the fluid for each possible overall temperature. Each possible value for the temperature differential that may be generated by the A/D converter may also have a corresponding overall temperature and corresponding flow rate of the fluid for each possible value generated by the A/D converter.

The fluid computing device 310 may determine the pump efficiency of the pump 12 based on the value generated by the A/D converter of the fluid monitoring device 32. As the fluid monitoring device 32 continuously monitors the fluid flowing through the case drain 30, the fluid monitoring device 32 may provide fluid data to the fluid computing device 310 via the network 340 that includes the overall temperature of the fluid as well as the value generated by the A/D converter which represents the temperature differential of the fluid between the first point and the second point when the fluid is at the overall temperature. As noted above, the fluid monitoring device 32 may continuously monitor these characteristics of the fluid and thus may continuously provide an immense amount of this type of fluid data to the fluid computing device 310.

For each value generated by the A/D converter that is associated with an overall temperature of the fluid, the fluid computing device 310 may then determine the corresponding flow rate for the value and overall temperature. As noted above, the fluid monitoring device 32 may be configured with an A/D value table that is customized for the pump 12. For example, returning to FIG. 2, the fluid monitoring device 32 is configured with the exemplary ND value table 200 that is customized for the pump 12. The fluid computing device 310 may then reference the exemplary A/D value table 200 for each value provided by the fluid monitoring device 32 to determine the flow rate of the pump 12. The fluid computing device 310 may then determine the pump efficiency of the pump 12 by incorporating the flow rate provided by the exemplary ND value table 200 and the nominal flow rate of the pump 12 into Equation 1.

For example, the value generated by the A/D converter for the temperature differential of the fluid in the case drain 30 is 1300.4619 and the overall temperature of the fluid in the case drain is 101° F. The fluid computing device 310 may then reference the exemplary ND value table 200 to determine that the flow rate of the fluid in the case drain 30 with a value of 1300.4619 at an overall temperature of 101° F. is 3.5 GPM. The fluid computing device 310 may then determine the pump efficiency of the pump 12 by incorporating the flow rate of 3.5 GPM as well as the nominal flow rate of the pump 12 into Equation 1.

As the fluid monitoring device 32 continuously monitors the value that represents the temperature differential of the fluid as well as the overall temperature of the fluid, the fluid computing device 310 may continuously convert these characteristics into the flow rate of the fluid in the case drain by continuously referencing the exemplary A/D value table 200. The fluid computing device 310 may then incorporate the immense amount of pump efficiency calculations as the pump 12 continuously operates into easily understood analytics, such as the exemplary visual graph configuration 400 in FIG. 4.

In an embodiment, the fluid computing device 310 may determine a threshold associated with the value provided by the fluid monitoring computing device 32 that represents the temperature differential of the fluid in the case drain 30. The fluid computing device 310 may determine based on previous pump efficiency calculations that when a maximum flow rate of the fluid in the case drain is exceeded when compared to the nominal flow rate of the pump 12 then that typically generates a pump efficiency that deviates below the threshold of the pump 12 requiring further attention by the user.

For example, the fluid computing device 310 may determine that when the fluid monitoring device 32 generates a value of 1300 or greater when the fluid is at an overall temperature of 102° F., that corresponds to a flow rate of 3.5 GPM or greater. The fluid computing device 310 may then determine that when a flow rate of 3.5 GPM or greater at an overall temperature of 102° F. is incorporated into Equation 1 with the nominal flow rate of the pump 12, that a pump efficiency of 85% or less is generated which then triggers the alarm to the user that further attention is required.

As a result, the fluid computing device 310 may generate an alert when the value that represents the temperature differential of the fluid in the case drain 30 is greater than a threshold. The fluid computing device 310 may determine the threshold of the value of the temperature differential based on the corresponding flow rate as provided in the exemplary A/D value table 200 when the corresponding flow rate typically results in a pump efficiency that deviates below the pump efficiency threshold of the pump 12.

The fluid computing device 310 may then generate an alert, such as via the pump efficiency status indicator 540, when the value of the temperature differential deviates below the threshold to indicate to the user that further attention is required. For example, the fluid computing device 310 may generate an alert each time the A/D converter generates a value of 1300 or greater when the fluid is at an overall temperature of 102° F. due to the flow rate of the fluid in the case drain being 3.5 GPM or greater which increases the likelihood that the pump efficiency of the pump 12 is 85% or less.

As noted above, the fluid monitoring device 32 may also include a first pressure sensor positioned at the first point and a second pressure sensor positioned at the second point on the case drain in addition to the first and second temperature sensors. The A/D converter may then generate a value based on the pressure differential measured at the first point and the second point as well as the temperature differential. The value that represents the temperature differential and the pressure differential of the fluid in the case drain may also be associated with an overall temperature of the fluid as well as flow rate.

The pump 12 may also have a customized A/D value table with regard to the pressure and temperature differential values generated by the A/D converter for each corresponding overall temperature of the fluid. The flow rate of the fluid may be determined based on the relationship of the pressure and temperature differential value generated by the A/D converter and the overall temperature of the fluid as provided in the customized A/D table for the pressure and temperature differential in a similar manner as discussed above with regard to the temperature differential.

The fluid computing device 310 may then determine the pump efficiency of the pump 12 by incorporating the flow rate provided by the A/D value table for values associated with both the pressure and temperature differentials and the nominal flow rate of the pump 12 into Equation 1. The fluid computing device 310 may also generate an alert based on a threshold of the value generated by the A/D converter that is based on the pressure and temperature differentials in a similar manner as discussed above.

Figure 6:
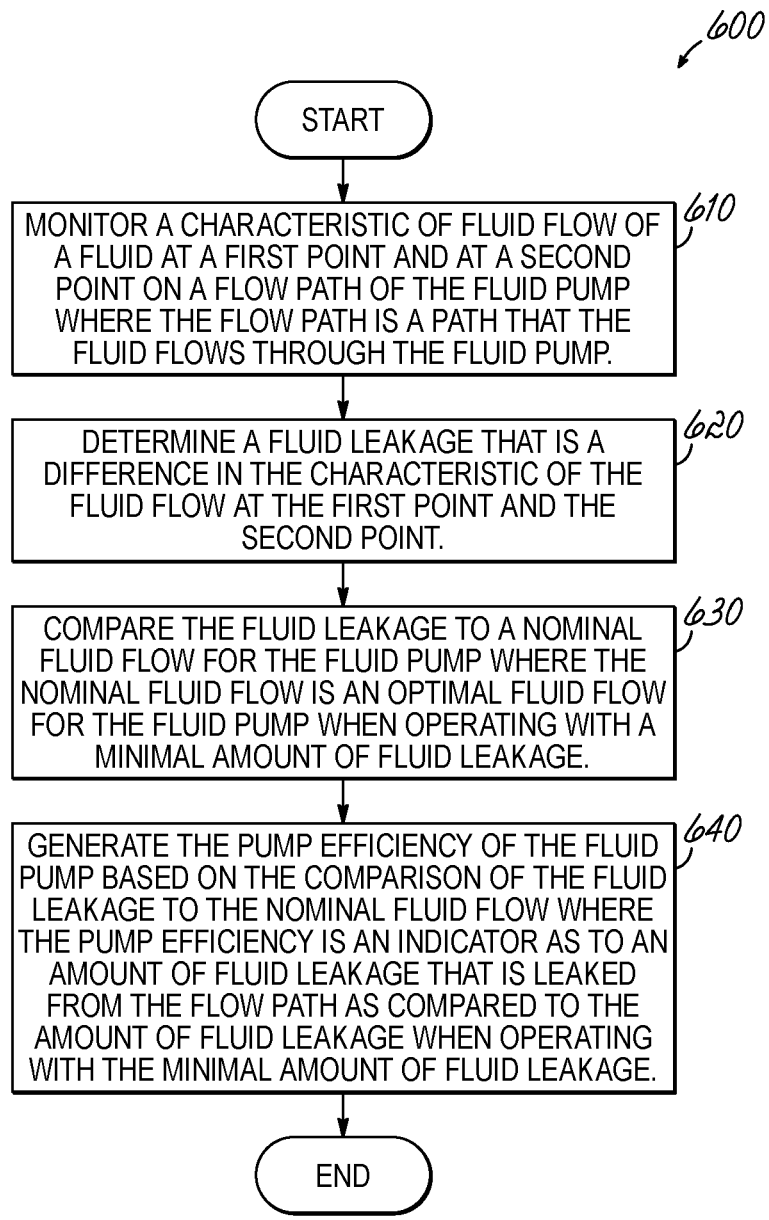
FIG. 6 is a flowchart of an exemplary process for determining pump efficiency of a fluid pump according to one embodiment of the invention.

Referring now to FIG. 6, a flowchart is presented showing an exemplary process 600 for determining a pump efficiency of a pump. As shown in FIG. 6, process 600 begins at step 610 when a characteristic of fluid flow of a fluid is monitored at a first point and a second point on a flow path of the pump. The flow path is a path that the fluid flows through the pump. For example, as shown in FIG. 1, the fluid monitoring device 32 may monitor a characteristic of fluid flow of a fluid, such as the flow rate of the fluid at a first point and at a second point on a flow path of the pump 12. The flow path is a path that the fluid flows through the pump 12, such as the case drain 30. As the characteristic of the fluid flow is monitored, the system may proceed to step 620 of process 600.

At step 620 of process 600, a fluid leakage that is a difference in the characteristic of the fluid flow at the first point and the second point is determined. For example, as shown in FIG. 3, the fluid computing device 310 determines a fluid leakage of the pump 12 that is a difference in the characteristic of the fluid flow, such as the temperature, at the first point and the second point. The system may then proceed to step 630 of process 600.

At step 630 of process 600, the fluid leakage is compared to a predetermined nominal fluid flow for the pump. The predetermined nominal fluid flow is a predetermined optimal fluid flow for the pump when operating with a minimal amount of fluid leakage. For example, the fluid computing device 310 compares the fluid leakage of the pump 12 to a predetermined nominal fluid flow for the pump 12. The predetermined nominal fluid flow is the optimal fluid flow for the pump 12 when operating with a predetermined minimal amount of fluid leakage such as when the pump 12 has minimal wear and is operating at a level similar to when the pump 12 was first commissioned.

At step 640 of process 600, the pump efficiency for the pump is generated based on the comparison of the fluid leakage to the predetermined nominal fluid flow. The pump efficiency is an indicator as to an amount of fluid leakage that is leaked from the flow path as compared to the amount of predetermined fluid leakage when operating with the predetermined minimal amount of fluid leakage. For example, the fluid computing device 310 may generate the pump efficiency of the pump 12 based on the comparison of the fluid leakage to the predetermined nominal fluid flow of the pump 12.

While various aspects in accordance with the principles of the invention have been illustrated by the description of various embodiments, and while the embodiments have been described in considerable detail, they are not intended to restrict or in any way limit the scope of the invention to such detail. The various features shown and described herein may be used alone or in any combination. Additional advantages and modifications will readily appear to those skilled in the art. The invention in its broader aspects is therefore not limited to the specific details and representative devices shown and described. Accordingly, departures may be made from such details without departing from the scope of the general inventive concept.

What is claimed is:

1. A method of monitoring a condition of a pump, comprising:
 determining, by a computing device, a pump efficiency based on a fluid leakage flow rate and a nominal flow rate for the pump, the fluid leakage flow rate being a monitored flow rate through a flow path through which a fluid leakage flows from a case drain of the pump, and the nominal flow rate being an optimal fluid flow rate for the pump when operating with a minimal amount of the fluid leakage;
 determining, by the computing device, whether the pump efficiency has dropped below or exceeded a pump efficiency threshold;
 if the pump efficiency has dropped below or exceeded the pump efficiency threshold, predicting, by the computing device, an impending pump failure; and
 in response to predicting the impending pump failure, generating, by the computing device, an alert indicative of the impending pump failure.

2. The method of claim 1 further comprising:
 determining, by the computing device, the fluid leakage flow rate through the flow path.

3. The method of claim 1 further comprising:
 receiving, by the computing device from a fluid monitoring device, a signal indicative of the fluid leakage flow rate.

4. The method of claim 3, wherein the signal includes first data defining an overall temperature of the fluid flowing through the flow path and second data defining a temperature differential between a first point and a second point on the flow path, and the computing device determines the fluid leakage flow rate through the flow path based on the first data and the second data.

5. The method of claim 4 wherein the first data and the second data are used to identify a value of the fluid leakage flow rate through the flow path in a value table.

6. The method of claim 5 wherein the pump is one of a plurality of pumps, the value table is one of a plurality of value tables each associated with a respective pump of the plurality of pumps, and the computing device selects the value table based on the pump being monitored.

7. The method of claim 1 wherein the computing device is one of a fluid monitoring device, a fluid computing device, or a fluid monitoring computing device.

8. The method of claim 7 wherein the computing device is the fluid computing device, and determining the flow rate comprises:
 receiving a signal indicative of the fluid leakage flow rate from the fluid monitoring device at the fluid computing device.

9. The method of claim 8 wherein the signal is transmitted from the fluid monitoring device to the computing device through a network.

10. The method of claim 9 wherein the signal includes first data defining an overall temperature of the fluid flowing through the flow path and second data defining a temperature differential between a first point and a second point on the flow path.

11. A system for monitoring a condition of a pump, comprising:
 one or more processors; and
 a memory storing instructions that, when executed by the one or more processors, cause the system to:
  determine a pump efficiency based on a fluid leakage flow rate and a nominal flow rate for the pump, the fluid leakage flow rate being a monitored flow rate through a flow path through which a fluid leakage flows from a case drain of the pump, and the nominal flow rate being an optimal fluid flow rate for the pump when operating with a minimal amount of the fluid leakage;
  determine whether the pump efficiency has dropped below or exceeded a pump efficiency threshold;
  if the pump efficiency has dropped below or exceeded the pump efficiency threshold, predict an impending pump failure; and
  in response to predicting the impending pump failure, generate an alert indicative of the impending pump failure.

12. The system of claim 11 wherein the instructions further cause the system to:
 determine the fluid leakage flow rate through the flow path.

13. The system of claim 11 wherein the instructions further cause the system to:
 receive a signal indicative of the fluid leakage flow rate.

14. The system of claim 13, wherein the signal includes first data defining an overall temperature of the fluid flowing through the flow path and second data defining a temperature differential between a first point and a second point on the flow path, and the instructions cause the system to determine the fluid leakage flow rate through the flow path based on the first data and the second data.

15. The system of claim 14 wherein the first data and the second data are used to identify a value of the fluid leakage flow rate through the flow path in a value table.

16. The system of claim 15 wherein the pump is one of a plurality of pumps, the value table is one of a plurality of value tables each associated with a respective pump of the plurality of pumps, and the instructions cause the system to select the value table based on the pump being monitored.

17. The system of claim 11 wherein the one or more processors comprise one or more of a fluid monitoring device, a fluid computing device, and a fluid monitoring computing device.

18. The system of claim 17 wherein the instructions cause the system to determine the flow rate by receiving a signal indicative of the fluid leakage flow rate from the fluid monitoring device at the fluid computing device.

19. The system of claim 18 wherein the signal is transmitted from the fluid monitoring device to the fluid computing device through a network.

20. The system of claim 19 wherein the signal includes first data defining an overall temperature of the fluid flowing through the flow path and second data defining a temperature differential between a first point and a second point on the flow path.

* * * * *